United States Patent
Fraser

(10) Patent No.: US 7,393,057 B2
(45) Date of Patent: Jul. 1, 2008

(54) PORTABLE ADJUSTABLE HEADREST

(76) Inventor: Lorraine Fraser, #11 602 Cook Street, Whitehorse, Yukon Territory (CA) Y1A 2R6

( * ) Notice: Subject to any disclaimer, the term of this patent is extended or adjusted under 35 U.S.C. 154(b) by 1 day.

(21) Appl. No.: 11/442,054

(22) Filed: May 26, 2006

(65) Prior Publication Data
US 2007/0273194 A1 Nov. 29, 2007

(51) Int. Cl.
A47C 1/10 (2006.01)
(52) U.S. Cl. ...................... 297/392; 297/399
(58) Field of Classification Search ............. 297/391, 297/392, 397, 399, 398, 406, 407, 401, 405; 248/205.2
See application file for complete search history.

(56) References Cited

U.S. PATENT DOCUMENTS

| 344,726 | A | * | 6/1886 | Dolton | 297/403 |
|---|---|---|---|---|---|
| 638,534 | A | * | 12/1899 | Welch | 297/406 |
| 1,589,900 | A | * | 6/1926 | Ringborg | 297/393 |
| 2,582,571 | A | | 1/1952 | Thoma | |
| 2,638,152 | A | * | 5/1953 | Pulsifer | 297/400 |
| 2,642,927 | A | * | 6/1953 | Rising | 297/398 |
| 3,029,107 | A | * | 4/1962 | Myers | 297/399 |
| 3,608,964 | A | | 9/1971 | Earl | |
| 3,643,996 | A | * | 2/1972 | Carnahan | 297/410 |
| 3,885,831 | A | * | 5/1975 | Rasmussen | 297/410 |
| 4,030,781 | A | | 6/1977 | Howard | |
| 4,154,478 | A | | 5/1979 | Cohune | |
| 5,074,574 | A | * | 12/1991 | Carwin | 280/304.1 |
| 5,800,019 | A | | 9/1998 | Knightlinger | |
| 5,868,471 | A | | 2/1999 | Graham et al. | |
| 6,017,094 | A | | 1/2000 | Syiek | |
| 6,033,023 | A | | 3/2000 | Strassner et al. | |
| 6,305,749 | B1 | | 10/2001 | O'Connor et al. | |
| 6,394,554 | B1 | | 5/2002 | Hingle | |
| 6,484,335 | B2 | | 11/2002 | Gilbert | |
| 6,554,363 | B1 | * | 4/2003 | Silva | 297/397 |
| 6,601,804 | B2 | | 8/2003 | Bisch | |
| 6,782,572 | B1 | | 8/2004 | Jones | |

* cited by examiner

*Primary Examiner*—David R Dunn
*Assistant Examiner*—Erika Garrett
(74) *Attorney, Agent, or Firm*—Gene Scott; Patent Law & Venture Group

(57) ABSTRACT

A portable headrest apparatus engages a top of a chair with a U-shaped bracket sized for clamping onto the chair top. The bracket provides a quick-release clamp holding a telescoping rod extending downwardly. An adjustable elbow joint at a downwardly terminal end of the rod enabled rotation of a support arm extending to a head rest mounting plate which is pivotally engaged with the support arm. A head rest cushion is removably attached to the head rest mounting plate which is thus able to be positioned for comfortably resting one's head in almost any position desired.

15 Claims, 3 Drawing Sheets

PORTABLE ADJUSTABLE HEADREST

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to head rests and supports and more particularly to a mechanical headrest capable of being mounted on the top of a chair such as those used in commercial airliners, and adjusting a head support surface to a comfortable position for resting one's head.

2. Description of Related Art Including Information Disclosed Under 37 CFR 1.97 and 1.98

Earl, U.S. Pat. No. 3,608,964, discloses a pillow unit for the head of a passenger in a vehicle seat that is attached to the back of the seat and supports the head of the passenger and includes a base member or sheet attached to the seat with a pillow extending outwardly from the back a sufficient distance and at proper angle to support the head in a comfortable position. The base sheet is attached to the seat back by a lower elastic strap and by upper patches or Velcro or similar material, which cooperates with other patches of Velcro on the seat back. In a preferred form, the pillow includes a cover and a removable pillow insert, which can be removed for cleaning purposes. Thoma, U.S. Pat. No. 2,582,571, discloses a headrest of the character described: a band providing reaches designed to extend across front and rear surfaces, respectively, of a seatback; a pair of triangularly-shaped bases disposed in spaced-apart relation with one another; each base having one side thereof secured to the front reach of the bank; the bases defining inclined sides converging relatively to one another in a direction toward the front reach of the band; and resilient pads secured to the inclined sides of the bases and projecting toward one another and away from the front reach of the band to embrace opposite sides of a person's head introduced therebetween. Howard, U.S. Pat. No. 4,030,781, discloses an improved detachable headrest, specifically intended for lawn chairs. The headrest has a metal or plastic frame featuring adjustable height means and quick release design. Cohune, U.S. Pat. No. 4,154,478, discloses a portable headrest for use in conjunction with the seats of public transportation vehicles. The headrest comprises a pair of padded supports which are secured to a chair back by means of a belt or a pair of hangers. The pair of supports are spaced apart to bracket the user's head and, in combination with the chair back, provide support for the user's head on three sides. The height of the headrest on the chair back is adjustable as is its position relative to the sides of the chair back. Each of the supports are also independently movable to adjust the spacing of the pads relative to each other. The unit is compact, portable and easily packed in a briefcase or suitcase. Schaked et al., U.S. Pat. No. 5,613,736, discloses a removable headrest device for seats with headrest. The device includes two boards that are joined by an elastic and an non-elastic band that embrace the headrest of the seat, and extend forward a sufficient distance to serve as a support for a user. Velcro pads are used to cooperatively tighten the non-elastic band in order to keep the removable headrest device firmly in place. Advertising or promotional or any other graphic material can be placed in the free areas of the boards. Optimally, protective covers with advertising material are removably inserted on the distal ends of the boards. Knightlinger, U.S. Pat. No. 5,800,019, discloses a headrest for use in combination with a seat back structure, including a clamp having a plurality of attachment sites and being detachably attachable to a side or top of the seat back structure; and a cushion detachably attachable to the clamp at any one of the attachment sites, at varying locations and angles. The clamp is D-shaped and has a rounded front portion bearing the plurality of attachment sites, and a back portion. Each attachment site is tubular and is interiorly threaded. The cushion has an external threaded portion and is attachable to the clamp by threading the threaded portion into a selected tubular portion to a desired depth to effect a desired headrest location and angle. Graham et al., U.S. Pat. No. 5,868,471, discloses a headrest that includes a cushion attached to the front of a rigid back. A pair of arms slideably extend from the sides of the rigid back. The ends of the arms are pivotal to an orthogonal portion for clamping to a seatback. The hook portion of a hook-and-loop fastener is attached to the inner side of each end of the arm for grabbing the looped fabric on the seatback. A pair of keyhole-shaped sockets are arranged on opposite ends of the rigid back. An arm is inserted into one of the sockets, and a side bolster is pivotally attached to the arm. The cushion supports a head in a neutral position without requiring the user to lean back, and the side bolster restrains the head from falling to one side. The angle of the side bolster is adjustable for conforming to a leaning head. In a second embodiment, the headrest includes a cushion removably positioned in a recess on a housing. A cylindrical rod extending from a side bolster is inserted into one of a plurality of holes arranged on opposite ends of the housing. The headrest is attachable to a seat with a single strap. Strassner et al., U.S. Pat. No. 6,033,023, discloses a portable, compact, flexible and inflatable headrest for securing to one or two vehicle seats having a separately inflatable headrest section contoured for optimal head support and a separately inflatable base for inserting in the space between adjoining seats of a passenger vehicle or in the space between the top of a vehicle seat provided with an extendible seat head rest and the bottom of the extended seat head rest to optimize rest comfort for a passenger using the headrest. Syiek, U.S. Pat. No. 60,170,194, discloses a travel pillow for attachment to a shoulder harness seat belt. O'Connor et al., U.S. Pat. No. 6,305,749, discloses a headrest for supportably engaging a person's head at rest to substantially inhibit neck strain. In one embodiment, the headrest includes a center portion for supporting a neck portion of a person's head and first and second wing portions for supporting first and second side portions, respectively, of the person's head, and padding covering at least a portion of the center portion and the first and second wing portions. In another embodiment, the center portion is located distally relative to the first and second wing portions, and is adapted to frictionally and/or abuttingly engage the back surface of a seatback to releasably secure the headrest to a seatback. In this embodiment, the headrest includes substantially U-shaped first and second intermediate portions extending between the first and second wing portions and first and second end portions of the center portion, respectively, for pinching or compressively engaging front and back surfaces of an upper portion of the seatback. Hingle, U.S. Pat. No. 6,394,554, discloses a "7"-shaped seat belt pillow that includes a neck-supporting pillow member which is adapted to be placed behind the head or neck while sitting in a vehicle's seat. The neck-supporting pillow member has integrally formed therewith a secondary body pillow member, which is angled to approximate the angle of a buckled shoulder-restraining strap. The secondary body pillow is adapted to be strapped to the seat belt and can be snuggled and hugged. Gilbert, U.S. Pat. No. 6,484,335, discloses a pillow apparatus that includes a pillow unit which includes a first pillow end and a second pillow end which are situated along a longitudinal pillow axis. The pillow unit also includes a front pillow face and a rear pillow face. A first strap is connected to the first pillow end, and a second strap is connected to the second pillow end. The pillow unit can include a pillow housing and a pillow cushion retained in the pillow housing. A pocket assembly is connected to the pillow unit. The pocket assembly includes a zipper or Velcro fastener. The pocket assembly is connected to the rear pillow face. Each of the first strap and the second strap includes a respective strap length first connector and a strap length second connector. The first strap and the second strap are connected to the respective pillow ends by respective strap-mounted connectors. Bisch, U.S. Pat. No. 6,601,804, discloses a headrest for supporting a person's head that includes a back panel adapted to abuttingly engage a person's head that includes a first hinge-forming groove at each end, and two side wing members pivotally and foldably attached to the back member at or near its ends with the side wing members including an offset portion with an axle rotatable in the first hinge-forming groove. Silva, U.S. Pat. No. 6,554,363, discloses a device that is a seat belt pillow apparatus for removably attaching a pillow to a sash strap of a conventional lap and sash type seat belt. The seat belt pillow apparatus has a sash strap cover, which cover is removably fastened to the sash strap. A pillow is provided with a fastener on its outer surface whereby the pillow may be removably attached to the sash strap cover. Jones, U.S. Pat. No. 6,782,572, discloses a multi-use pillow that includes a body member of generally cylindrical geometry having at least two elongated flat attachment strips, each preferably comprising a loop fastener material on one surface of the strip and having a smooth surface on the opposite side surface of the strip, and being attached to the outer surface of the body member with their respective loop-bearing surface exposed outwardly. At least one, and preferably two mounting straps, each having a first surface bearing a loop fastener material thereon, except for a short length of hook fastener material adjacent one end of the strap, and a second surface bearing a hook fastener material thereon, is anchored at one of its opposite ends to the body member at a location adjacent one of the opposite ends of the body member, with the remainder of the strap extending unsupported from the body member a distance that is equal to at least about the length of the body member, and preferably a multiple, preferably two to three multiples, of the length dimension of the elongated body member whereby the mounting strap is suitable for releasably mounting the pillow to a support such as the frame of a chair, etc.

Our prior art search described above teaches the use of a seat back clamp for positioning a head rest (U.S. Pat. No. 5,800,019) and a large number of head resting devices. However, the prior art fails to teach a head rest cushion that may be positioned at almost any angle and elevation relative to a seat back so as to provide a highly adaptable rest surface position. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

A portable headrest apparatus engages a chair, such as those used in commercial airliners, buses, trains, etc. with a U-shaped bracket sized for clamping onto the chair top. The bracket provides a quick-release clamp holding a telescoping rod extending downwardly. An adjustable elbow joint at a downwardly terminal end of the rod enables rotation of a support arm extending to a head rest mounting plate which is pivotally engaged with the support arm. A head rest cushion is removably attached to the head rest mounting plate which is thus able to be positioned for comfortably resting one's head in almost any position desired.

A primary objective inherent in the above described apparatus and method of use is to provide advantages not taught by the prior art.

Another objective is to provide a portable head rest with adjustable positioning of a head resting surface.

A further objective is to provide such a rest easily mounted and dismounted on the back of a seat.

A further objective is to provide such a rest wherein a cushion may be easily replaced.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

The accompanying drawings illustrate at least one of the best mode embodiments of the present apparatus and method of it use. In such drawings.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

Described now in detail is a portable headrest apparatus 10, as shown in the figures, which is adapted by its size, shape and flexibility, as will be described below, for engagement with a top 22 of a chair 20, such as those used in commercial airliners, buses, trains, etc. The apparatus 10 may also be attached to other objects such as certain chair arm rests and such.

Figure 1:
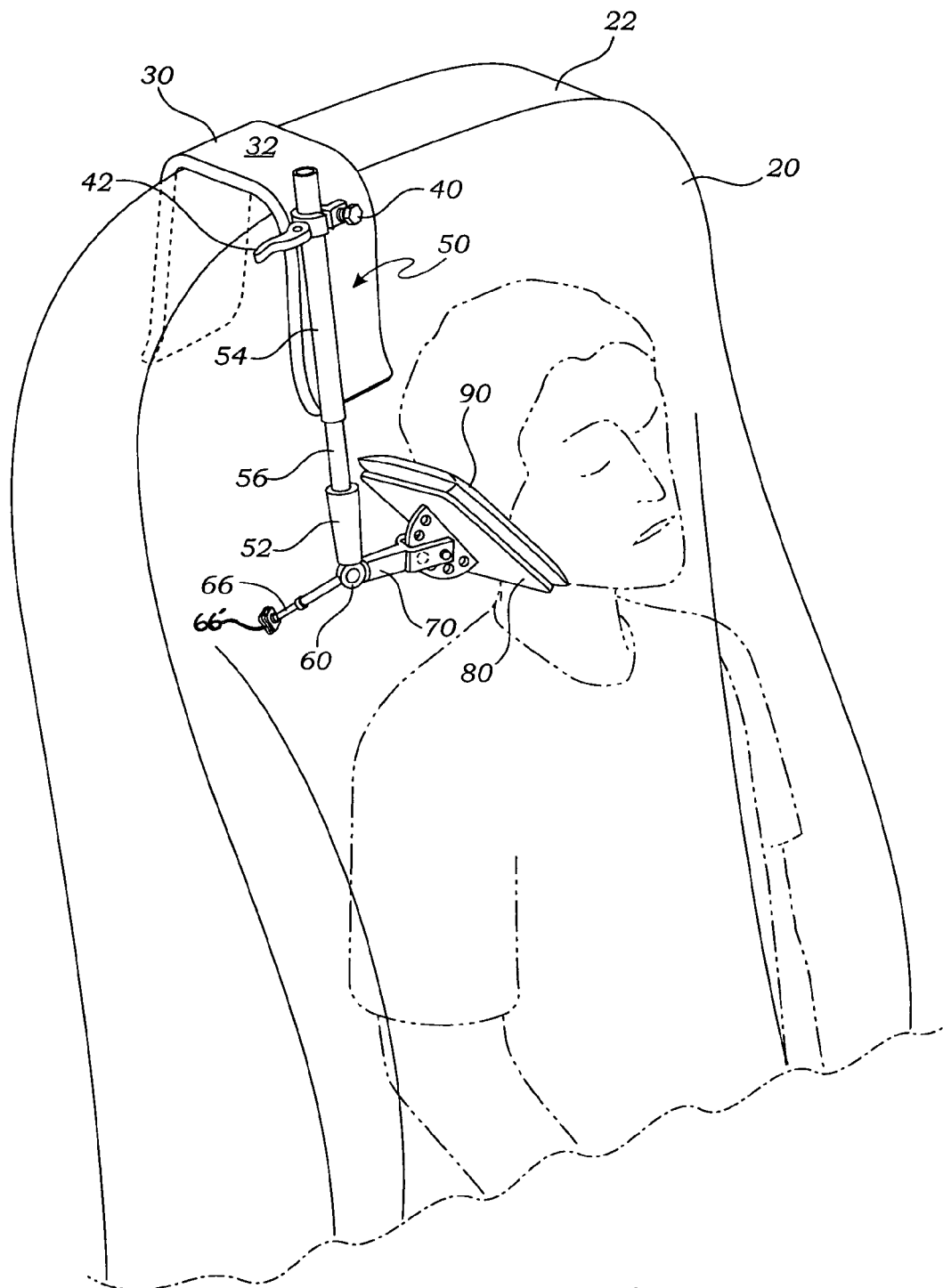
FIG. 1 is a perspective view of the presently described apparatus showing a headrest portion thereof at an angle.
Figure 2:
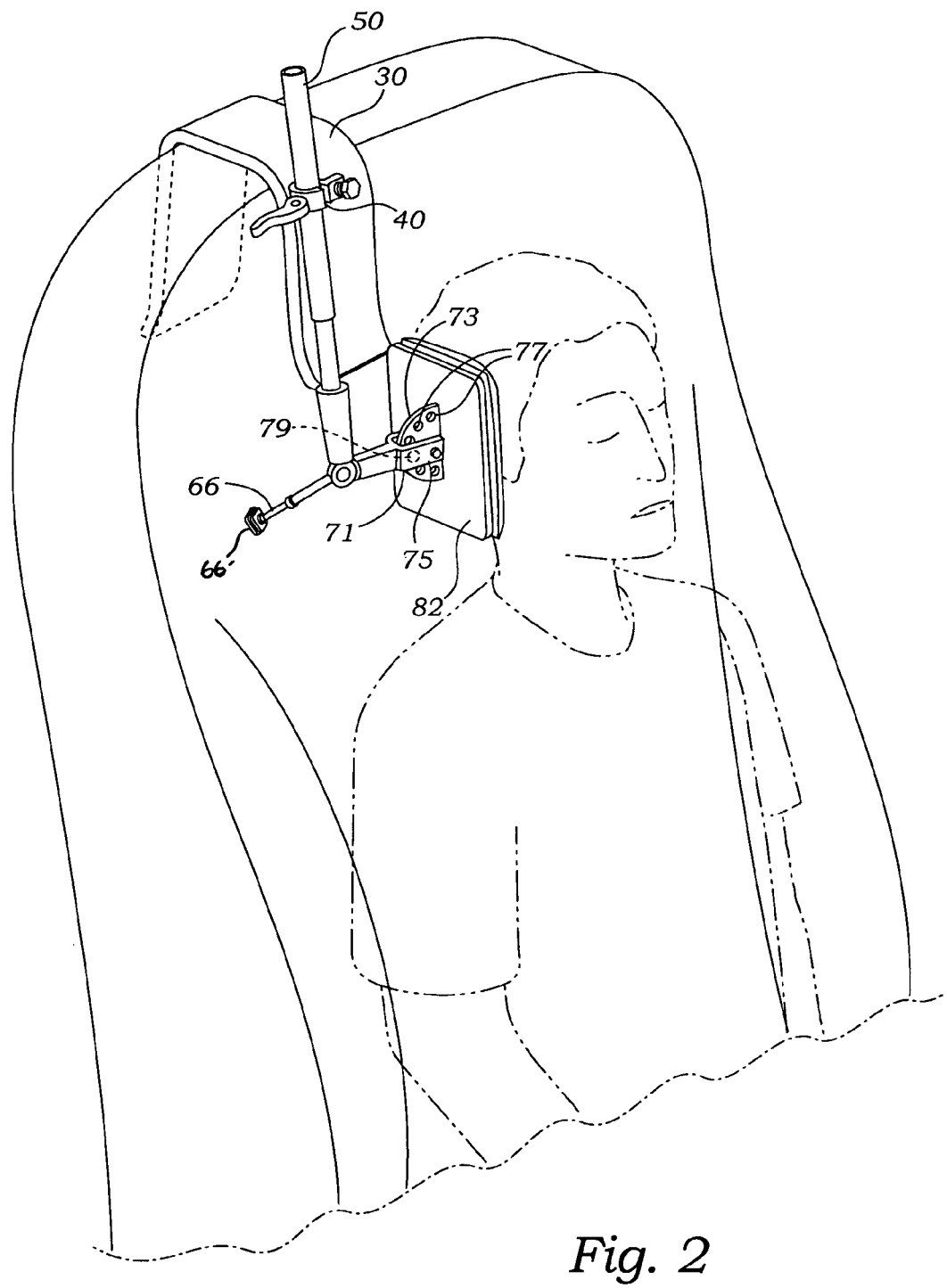
FIG. 2 is a perspective view thereof showing the headrest portion at a more vertical angle.

A U-shaped bracket 30, preferably made of flexible plastic or metal, is configured and sized, as shown, for being placed over, and therefore receiving within it, the chair top 22 as is clearly shown in FIGS. 1 and 2. Of necessity, the bracket 30 is formed so as to be able to grip the chair top 22 compressively so that it is not easily dislodged. Both engineering plastics and metals are able to accomplish this as would be known to those of skill in the art. It is noted that the bracket 30 has one leg extending down on both opposing sides of the chair 20 and a base connecting the two legs that rests atop of the chair. The legs of the bracket 30 are spread apart to clamp onto the chair 20 and it is this clamping action that allows the bracket 30 to secure itself to the chair 20 and yet be easily lifted off the chair 20 when desired.

The bracket 30 has mounted on its exterior surface 32, a quick-release clamp 40 as shown. A telescoping rod 50 is engaged with the clamp 40 and extends downwardly therefrom when the bracket 30 is engaged with the chair top 22. Such a clamp 40 is a well known hardware item made of steel and able to apply considerable clamping force. It is used broadly for quickly gripping a rod or similar element when necessary, and just as quickly, releasing it. The means for adjusting clamp 40 is lever 42 as is well known. Therefore, when clamp 40 is released rod 50 may be moved as shown by arrow "A" in FIG. 3 to a desired position. Such adjustment may be understood by comparing the positions of rod 50 in FIGS. 1 and 2.

Figure 3:
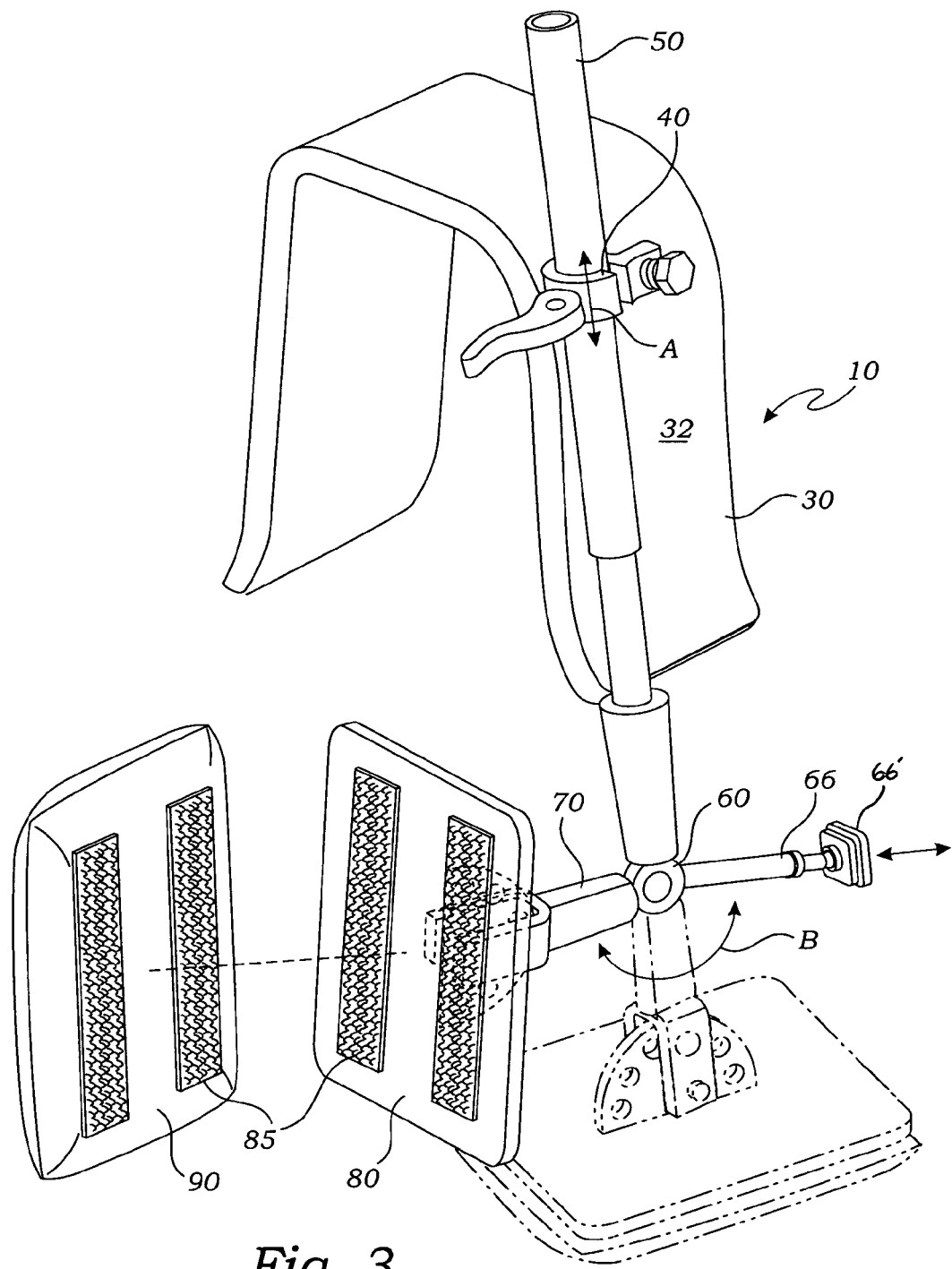
FIG. 3 is a further perspective view thereof illustrating range of motion of an elbow joint thereof and an attachment method of a head rest cushion to a head rest mounting plate thereof.

An adjustable elbow joint 60 is fixed at a downwardly terminal end 52 of the rod 50, and a first support arm 70 is engaged with the elbow joint 60 so as to extend away from the joint 60. It is shown in comparing FIGS. 2 and 3 that the joint 60 is able to rotate at least through 180 angular degrees (see arrow "B" in FIG. 3) so as to extend horizontally away from the joint 60 both to the right (FIG. 2) as well as to the left (FIG. 3). Such a joint is a well known hardware item and operated by friction such that when arm 70 is set at a desired angle, it tends to stay at such an angle until forced to move to a different angle. Such an elbow joint 60 may also have a well known finger nut (not shown) attached for manually tightening it. A second support arm 66 is preferably engaged with the elbow joint 60 and extends away in a second direction in opposite to that of the first support arm 70. The second support arm 66 is telescopingly extensive also and terminates with a foot piece 66' that enables it to grip seat fabric when pressed against it. In this manner, the second support arm 66 is able to prevent the rod 50 from moving laterally on the seat 20 when weight is placed on the cushion plate 80 as when the head rests against it.

A head rest mounting plate 80, preferably of plastic, is pivotally engaged with the support arm 70 in a position spaced away from the elbow joint 60, and a head rest cushion 90 is removably attached to the head rest mounting plate 80. Such a mounting plate 80 is preferably rigid for accepting a resting weight without flexing. The cushion 90 may be made of any of the well known types including foam rubber, feathers and other pillow fill materials. Therefore, the assembly provides for positioning the cushion 90 for convenient support of the head of a person reclining within the chair 20 as shown in FIGS. 1 and 2.

Preferably an angle adjustment fixture 75 is engaged with the support arm 70 and the mounting plate 80. Such an adjustment fixture 75 may be of any type, but preferably comprises a fork 71 at the free end of support arm 70 and a half-disc shaped sector 73 engaged with the rear side 82 of mounting plate 80 as shown in FIG. 2, the fork 71 pivotally engaging the sector 73 so as to allow the plate 80 to rotate over a considerable range of motion. The sector 73 also provides a series of holes 77 arranged circularly whereby with rotation of the sector 73 any one of the holes 77 may be engaged with a ball bearing 79 mounted within the fork 71 so as to detent the sector 73 relative to the fork 71 at a selected one of several angular positions.

The cushion 90 is preferably affixed to the mounting plate 80 by hook and loop surface fasteners 85 so that it may be easily attached and removed.

Preferably, the telescoping rod 50 comprises at least two collinear frictionally engaged rod portions 54 and 56 such that the telescoping rod 50 as a whole is extensible and retractable to suit the needs of both taller and shorter users when moving the rod 50 within clamp 40 is not convenient.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A portable adjustable headrest apparatus adapted for engaging a chair, the apparatus comprising: a bracket positioned for engaging the chair; a telescoping rod engaging the bracket; an adjustable elbow joint at a downwardly terminal end of the telescoping rod; a first support arm engaged with the elbow joint and extending away therefrom in a first direction and rotatable about the elbow joint; a head rest mounting plate pivotally engaged with the first support arm and spaced apart from the elbow joint; and a second support arm engaged with the elbow joint and extending away therefrom in opposition to the first support arm, the second support arm terminating with a foot piece adapted and positioned for resisting the apparatus from moving laterally on the chair.

2. The apparatus of claim 1 wherein a head rest cushion is removably secured to the mounting plate.

3. The apparatus of claim 1 wherein the telescoping rod comprises at least two collinear, frictionally engaged rod portions such that the telescoping rod is extensible.

4. The apparatus of claim 1 wherein an angle adjustment fixture is engaged with the first support arm and the mounting plate, the angle adjustment fixture providing a fork pivotally engaging a half-disc shaped sector, the sector providing a series of holes arranged circularly whereby with rotation of the sector any one of the holes are engagable with a ball bearing mounted within the fork and enabling detent of the sector relative to the fork.

5. A portable adjustable headrest apparatus comprising: a bracket providing a rod terminating with an adjustable elbow joint; a first support arm engaged with and rotatable about the elbow joint and terminating with a head rest mounting plate pivotally engaged with the first support arm; and a second support arm engaged with the elbow joint and extending away therefrom in a direction in opposition to the first support arm, the second support arm terminating with a foot piece adapted and positioned for resisting the apparatus from moving laterally on the chair.

6. The apparatus of claim 5 wherein a head rest cushion is removably secured to the mounting plate.

7. The apparatus of claim 5 wherein the rod comprises at least two collinear frictionally engaged rod portions for telescopic extension thereof.

8. The apparatus of claim 5 wherein an angle adjustment fixture is engaged with the first support arm and the mounting plate, the angle adjustment fixture providing a fork pivotally engaging a half-disc shaped sector, the sector providing a series of holes arranged circularly whereby with rotation of the sector any one of the holes are engagable with a ball bearing mounted within the fork and enabling detent of the sector relative to the fork.

9. The apparatus of claim 5 wherein the second support arm is telescopically extensive.

10. A chair with adjustable headrest apparatus comprising: a chair having a portion extending upwardly for resting a head of an occupant, a bracket positioned for engaging the upwardly extending portion of the chair; a telescoping rod engaging bracket; an adjustable elbow joint at a downwardly terminal end of the rod; a first support arm engaged with and rotatable about the elbow joint and extending away therefrom in a first direction; a head rest mounting plate pivotally engaged with the first support arm and spaced apart from the elbow joint; and a second support arm engaged with the elbow joint and extending away therefrom in opposition to the first support arm, the second support arm terminating with a foot piece adapted and positioned for resisting the apparatus from moving laterally on the chair.

11. The apparatus of claim 10 wherein a head rest cushion is removably secured to the mounting plate.

12. The apparatus of claim 10 wherein the telescoping rod comprises at least two collinear, frictionally engaged rod portions such that the telescoping rod is extensible.

13. The apparatus of claim 10 wherein the angle adjustment fixture is engaged with the first support arm and the mounting plate, the angle adjustment fixture providing a fork pivotally engaging a half-disc shaped sector, the sector providing a series of holes arranged circularly whereby with rotation of the sector any one of the holes are engagable with a ball bearing mounted within the fork and enabling detent of the sector relative to the fork.

14. The apparatus of claim 1 wherein the second support arm is telescopically extensive.

15. The apparatus of claim 10 wherein the second support arm is telescopically extensive.

* * * * *